May 18, 1937. N. STATHAM ET AL 2,081,112
METHOD OF PRODUCING LIGHT PRECIPITATED CHALK
Filed Jan. 7, 1932
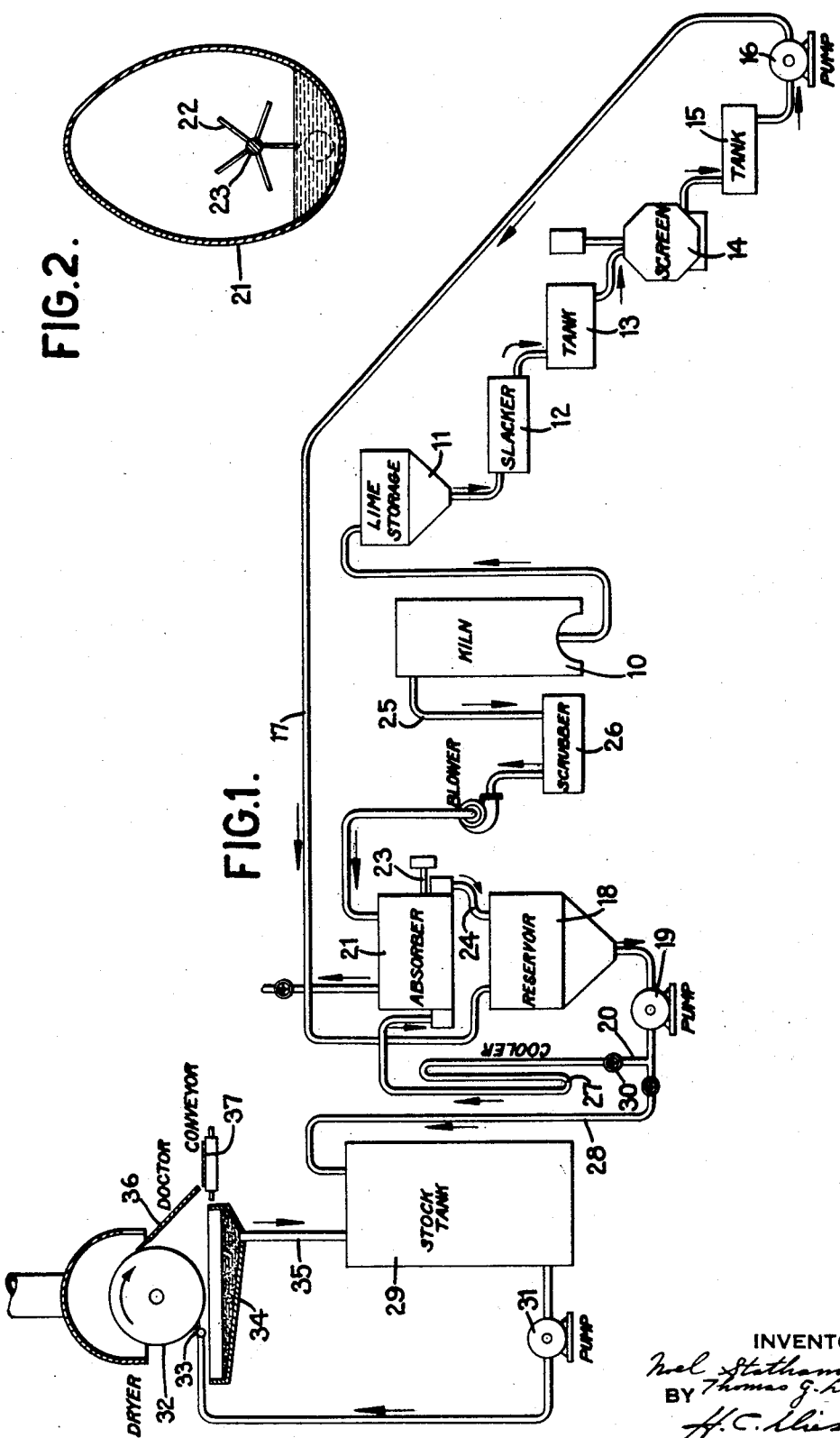
INVENTORS
Noel Statham and
BY Thomas G. Keck
H.C. Sweeney
ATTORNEY Patented May 18, 1937

2,081,112

UNITED STATES PATENT OFFICE

2,081,112

METHOD OF PRODUCING LIGHT PRECIPITATED CHALK

Noel Statham, Irvington, N. Y., and Thomas G. Leek, Covington, Va., assignors, by mesne assignments, to West Virginia Pulp & Paper Company, New York, N. Y., a corporation of Delaware Application January 7, 1932, Serial No. 585,176

8 Claims. (Cl. 23—66)

This invention relates to a very light form of precipitated chalk and to a method and apparatus whereby such a chalk or a heavier chalk may be produced at will.

Many efforts have been made to produce a light chalk composed of the finest possible size of particles. These efforts have met with varying degrees of success. They have not, however, resulted in the production of chalk having the fine degree of sub-division which is recognized to be particularly desirable for a variety of purposes. In accordance with the present invention we have succeeded in the production of a much finer and lighter chalk than has ever been produced heretofore. At the same time the method which we have devised for producing this exceptionally fine, light chalk is capable of such regulation and control that chalk of varying degrees of fineness may be obtained. The process may be so conducted that either a very fine or a comparatively coarse product, or any intermediate type of product, may be obtained at will.

In the conduct of the improved process, chalk or limestone or similar substance composed largely or entirely of chalk is burned in a kiln to release carbon dioxide from the calcium carbonate. The lime resulting from the operation is slacked and screened to remove impurities and is then passed in a watery suspension or solution to an absorber where it is subjected to violent agitation in an atmosphere of carbon dioxide which may suitably be recovered from the kiln. After a suitable period of reaction in the absorber the liquid containing chalk in suspension is passed to suitable drying equipment and subsequently any lumps that may be produced in the course of drying may be broken up by means of any appropriate form of crusher or disintegrator. However, in this connection, it is a feature of the process that no lumps will normally be produced in the course of drying.

Now we have discovered that there are various controlling factors which enter into the production of products of varying degrees of fineness and there are certain optimum conditions which should be observed when it is desired to produce an exceptionally fine, light product. For example the more thoroughly the burning operation in the kiln is carried out, other factors remaining the same, the finer will be the final product. The extent or degree of agitation in the absorber is an important factor. In general the more violent the agitation, the finer will be the precipitated chalk. As will be more fully explained hereinafter, the absorber should be so constructed and operated that the agitator will cause a fine mist of the milk of lime to be thrown above a small body of the liquid at the bottom of the absorber. If this mist or spray is composed of fine liquid particles containing lime in suspension or solution, the chalk will be correspondingly fine. Another important factor is the temperature maintained in the absorber. We have found that a temperature in the neighborhood of 55° C. is particularly effective for the production of a fine, pulverulent chalk. If the absorber is maintained at a lower temperature, a coarser product will result while temperatures materially above that mentioned will similarly be found to adversely affect the final product. It has been discovered, however, that the effect of a drop in the temperature below that specified may be offset by a more vigorous agitation of the liquid in the absorber.

A still further factor which affects the nature of the final product is the speed of precipitation of the chalk. This in turn is governed by the concentration of the milk of lime acted upon and the rate at which this, as well as the carbon dioxide gas, is admitted to the absorber. The rate of precipitation is also affected by the temperature and degree of agitation in the absorber. We have discovered that chalk of exceptional fineness is obtained when the conditions of operation are such that carbonation takes place at a relatively slow rate of, say, 5% per hour, based upon the quantity of lime introduced into the absorber.

While certain preferred conditions may be specified with respect to each of the controlling factors for the production of a chalk of given character, the interrelation of the various factors is such that a variation in one may be offset by a corresponding variation in one or more of the others.

With this general explanation of the nature and features of the invention, an illustrative form of the novel process may now be described in further detail by reference to the accompanying drawing, in which:

Figure 1 illustrates diagrammatically suitable equipment which may be employed in the conduct of the process, and Figure 2 is a transverse sectional view through the absorber.

Referring now to the drawing, there is schematically disclosed a kiln 10 of any suitable form adapted to receive charges of material containing calcium carbonate and preferably also alternate charges of coke or similar fuel. Here the carbonate is broken down with the evolution of carbon dioxide and the formation of lime. The extent to which the carbonate is burned may be varied to suit the particular requirements of the final product. If an extremely light product is desired, the carbonate should be burned hard while for a coarser product a less severe burning is satisfactory. The lime is removed from the bottom of the kiln and passed to a lime storage tank or hopper 11 from which it is fed to any suitable form of slacking equipment 12. Here the lime is thoroughly slacked and reduced to milk of lime, which may be passed to a storage tank 13. From this the material may be passed to any suitable equipment for the removal of various impurities, such as sand and the like. For this purpose a screen 14 of appropriate form, such as a rotary, spray, suction screen may be utilized. The screening surface may suitably be of a 150 to 200 mesh. This will eliminate all forms of grit insoluble in the water and too coarse to pass through the screen. The milk of lime which passes into the interior of the screen may be passed to a storage tank 15. A pump 16 may be employed to force the liquid from the tank 15 through a line 17 into a reservoir 18. The material introduced into the reservoir in this way may be of any suitable concentration adapting it to be readily reacted with carbon dioxide in the absorber. It has been found that the degree of concentration most suited for a particular operation varies with the nature of the final product desired and also with the degree of burning of the original material, which likewise has its effect upon the product. The concentration should preferably be somewhere between 100 and 150 grams of lime per liter of the milk of lime. When it is desired to produce an extremely light product, the lime is burned hard and is employed in a liquid of relatively low concentration, in the neighborhood of 100 grams per litre, but when a coarser product is desired or considered satisfactory, the lime may be burned to a less extent and the concentration of the milk of lime may be higher.

From the bottom of the reservoir 18 the material may be withdrawn by a pump 19 and passed through a pipe 20 to an absorber 21. The liquid is preferably introduced into the bottom of the absorber, which most suitably is substantially elliptical or egg-shaped in transverse cross-section but presents a cylindrical appearance from the side. A relatively small quantity of the liquid is maintained in the bottom of the absorber, occupying not more than a quarter of the volume of the vessel as indicated in Figure 2. An agitator 22 of suitable form extending lengthwise of the absorber and carried by a shaft 23 may have a series of vanes or blades adapted to dip a slight distance into the liquid and whip it into a spray as the agitator is rotated. The speed of rotation should be sufficient to develop a fine mist throughout the space above the liquid, and it should be increased according to the degree of fineness desired in the final product. The form of the shell of the absorber is such that a fine cloud or mist containing minute particles of the liquid will be thrown into all portions of the space within the shell and will be maintained in a constant state of agitation. No corners are provided into which any portion of the mist may be driven and become more or less stagnant. In order to maintain a substantially constant level of the liquid within the absorber, a quantity equal to that introduced by the pump 19 may be withdrawn, as through an overflow pipe 24, and passed to the reservoir 18. Here the partially treated liquid will be mixed with the main body of milk of lime introduced through the line 17 and will be recycled to the absorber.

Carbonation is brought about in the absorber by maintaining a constant atmosphere of carbon dioxide above the liquid. The gas for this purpose may be suitably derived from the kiln 10 as the result of the burning of the lime and combustion of the fuel therein. The gaseous products from the kiln may be led through a line 25 to a scrubber 26 where it may be suitably subjected to the washing action of water, which is either sprayed into the scrubber at the top or is agitated into a fine mist within the scrubber by a device similar to that provided in the absorber. After scrubbing, the gases are forced by a blower 27 into the top of the absorber, where an atmosphere containing carbon dioxide is constantly maintained. The operation of the absorber may be carried on under any suitable pressure. It may be at substantially atmospheric pressure, if desired, although a super-atmospheric pressure of, say, 20 to 100 lbs. per square inch, more or less, is considered preferable. Bringing the fine spray of milk of lime into intimate contact with the carbon dioxide within the absorber results in the production of extremely fine particles of chalk.

It has been found that a temperature between 50° and 60° C. or more particularly in the neighborhood of 55° C. within the absorber tends to bring about the most favorable results, particularly when an extremely fine product is desired. In order to maintain this temperature it is necessary to cool the liquid introduced into the absorber or otherwise effect a drop in the temperature within the absorber to offset the heat produced in the reaction. For this purpose a cooling coil 27, or the like, of any suitable nature, may be conveniently interposed in the line 20 so that a part, or all, of the liquid which is circulated by the pump 19 may be subjected to cooling prior to introduction into the absorber.

When the reaction in the absorber has been carried on for a sufficient period by the recirculation of the liquid, it may be passed through a line 28 to a stock tank 29. In order to control the flow of the liquid from the pump 19, a pair of valves 30 may be provided in the lines 20 and 28. In the stock tank the chalk is permitted to settle somewhat and the denser liquid is withdrawn by a pump 31 and passed to a suitable dryer. This may, for example, consist of a drum 32 against which the material is sprayed from a pipe 33. Any excess material which does not adhere to the drum may be caught in a trough or pan 34 from which it is returned to the stock tank by a pipe 35. The dried chalk may be scraped from the drum surface by a doctor blade 36 and deposited on a conveyor 37 which may carry it to any suitable point of further treatment or disposition. This material will normally be in a fine pulverulent state but if any cakes or lumps are formed in the course of drying, they may be broken up in any suitable way.

If the process is conducted under the optimum conditions for the production of a finely divided chalk, it will be found that a product much finer than any heretofore obtained will be formed. A typical operation of this sort may include first a rather thorough calcining operation so that a hard, burned lime is produced. This is then suitably slacked and screened to provide milk of lime in the tank 15 having a density of about 110 grams per litre. A temperature of 55° C. is maintained in the absorber and a violent agitation is set up so that a very fine mist or spray of the milk of lime is dispersed throughout the absorber above the level of the liquid. A gas rich in carbon dioxide, derived from the calcination of the limestone, may be constantly introduced into the absorber under pressure so as to maintain a pressure of about 70 lbs. during the carbonation. The rate of introduction of the gas and the agitation should be such that carbonation will proceed at the rate of about 5% per hour, based upon the amount of lime undergoing treatment. When the operation is completed the carbonated milk of lime passed to the stock tank 29 should have a density of about 196 grams $CaCO_3$ per litre. The final product derived from such an operation will be found to be lighter than any chalk previously produced. For example, it may be subjected to a sedimentation test consisting of placing 10 grams of the chalk in a 100 c. c. graduated cylinder 530 square millimeters in cross section, adding distilled water to make up 100 c. c., shaking well for two minutes and then permitting the chalk to settle out by disposing the cylinder in a vertical position. If a reading is taken after two hours, it will be found that the light product of this process will have settled only to 94 c. c., leaving only 6 c. c. of clear water above. A relatively heavy grade of chalk produced by the present process under other conditions of operation has been found to settle to the 10 c. c. mark on the graduated cylinder within the two-hour period. This heavier grade of chalk may be produced by calcining the limestone to the extent of only a medium burn, producing milk of lime having a concentration of 130 grams of CaO per litre, and conducting the carbonation under conditions resulting in a rate of carbonation of about 11% per hour so that a carbonated product containing 232 grams $CaCO_3$ per litre is formed. Intermediate grades of chalk may be produced by varying the controlling conditions, such as the degree of burning, rate of carbonation, etc.

The lightness of the product of the present process may be determined in another way, which will be found to check closely with the sedimentation test. Fifteen grams of the chalk are placed in a Nessler tube 200 m. m. in length and 20 m. m. in diameter. Water is gradually added from a burette until the paste formed by incorporating the chalk in the water with shaking will flow of itself when the tube is inclined at an angle of 45°. The lightest chalk requires the addition of 54 m. m. of water before it will flow, while the heavy grade mentioned requires only 8 m. m. of water.

It will be apparent that various modifications may be made in the form and arrangement of the apparatus employed and in the various steps of the process. In lieu of recycling the stock from the reservoir 18 to the same absorber, a more or less continuous process may be carried out by providing one or more additional absorbers. Thus, the material after treatment in the first absorber may be passed to another absorber for further treatment. In this event it will be advisable to provide several cooling coils so that the material introduced into each absorber may be cooled to the proper point to maintain a desired temperature therein. Other changes may be made in both the equipment and method without departing from the general principles and scope of the invention as defined by the claims.

What we claim is:

1. A method of producing light precipitated, non-colloidal chalk which comprises agitating milk of lime with sufficient violence to create a fine mist in the presence of carbon dioxide, and maintaining the temperature of reaction between 50° and 60° C. substantially throughout the reaction.

2. A method of producing light precipitated, non-colloidal chalk which comprises agitating milk of lime with sufficient violence to create a fine mist in the presence of carbon dioxide, and maintaining a temperature of reaction of approximately 55° C. substantially throughout the reaction.

3. In a method of producing light precipitated, non-colloidal chalk by producing a fine mist of milk of lime in an atmosphere rich in carbon dioxide the step of varying the rate of introduction of the carbon dioxide to maintain a substantially uniform rate of carbonation at 5% per hour.

4. A method of producing extremely light, non-colloidal chalk which comprises producing a hard burned lime, slacking the same to form milk of lime of relatively low concentration, and contacting said milk of lime as a fine mist with carbon dioxide at a temperature of about 55° C. substantially throughout the reaction.

5. A method of producing extremely light, non-colloidal chalk which comprises producing a hard burned lime, slacking the same to form milk of lime of relatively low concentration, contacting said milk of lime as a fine mist with carbon dioxide in a reaction zone, and varying the rate of introduction of carbon dioxide so as to effect carbonation at a substantially uniform rate of approximately 5% per hour.

6. A method of producing extremely light, non-colloidal chalk which comprises producing a hard burned lime, slacking the same to form milk of lime of relatively low concentration, and violently agitating said milk of lime to form a fine mist in the presence of carbon dioxide at a temperature above 50° C. but not substantially above 60° C. throughout the reaction.

7. In a method of producing light, precipitated, non-colloidal chalk by the agitation of milk of lime in a closed chamber to produce a fine mist in the presence of carbon dioxide, the step of varying the rate of introduction of carbon dioxide into the chamber in such a way as to maintain a selected, substantially uniform rate of carbonation, said selected rate of carbonation being determined by the size of the particles desired, being greater for large particles than for small particles.

8. In a method of producing light, precipitated, non-colloidal chalk by the agitation of milk of lime in a closed chamber to produce a fine mist in the presence of carbon dioxide, the step of varying one or more of the operating conditions, including the temperature of the reaction, the violence of the agitation, the concentration of the suspension and the rate of introduction of carbon dioxide into the chamber, in such a way as to maintain a selected, substantially uniform rate of carbonation of between 5% and 11% per hour.

NOEL STATHAM.
THOMAS G. LEEK.